R. K. CRONKHITE.
STEEL BELT FASTENER.
APPLICATION FILED SEPT. 22, 1910.
1,012,061.
Patented Dec. 19, 1911.
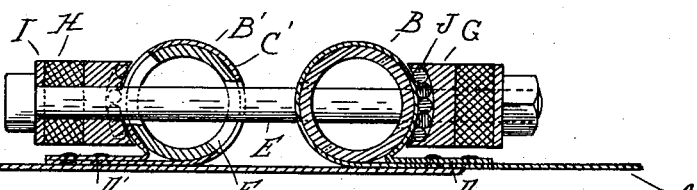
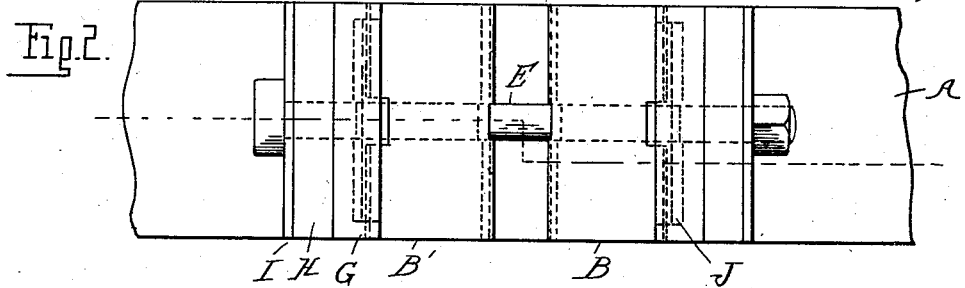
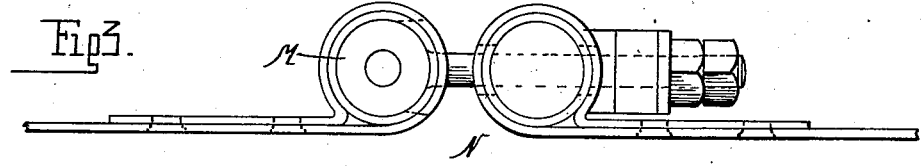
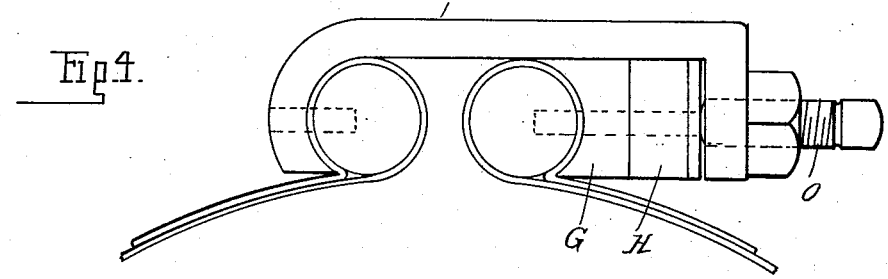
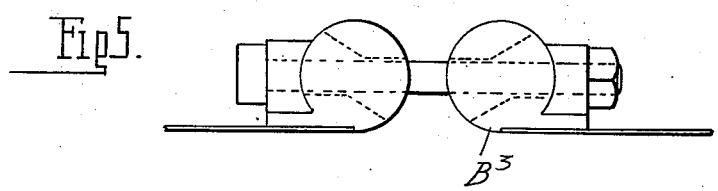
Witnesses
Inventor
Roy. K. Cronkhite
By Whittemore Hulbert & Whittemore
Attorneys

UNITED STATES PATENT OFFICE.

ROY K. CRONKHITE, OF DETROIT, MICHIGAN, ASSIGNOR OF ONE-HALF TO MONROE M. McGRATH, OF DETROIT, MICHIGAN.

STEEL-BELT FASTENER.

1,012,061.      Specification of Letters Patent.      Patented Dec. 19, 1911.

Application filed September 22, 1910. Serial No. 583,252.

*To all whom it may concern:*

Be it known that I, ROY K. CRONKHITE, a citizen of the United States of America, residing at Detroit, in the county of Wayne and State of Michigan, have invented certain new and useful Improvements in Steel-Belt Fasteners, of which the following is a specification, reference being had therein to the accompanying drawings.

The invention relates to belt fasteners and more particularly to a construction adapted for securing to each other, the ends of a steel or other metallic belt.

It is the primary object of the invention to relieve the belt from any localized stresses at the point of attachment which might result in a fracture.

It is a further object to provide a yieldable connection which in the case of the lodgment of any obstacle between the belt and pulley, will yield sufficiently to prevent breakage, while further it is an object to provide an easily operable means of adjustment to reduce friction between the coöperating parts.

With these objects in view the invention consists in the construction as hereinafter set forth.

In the drawings,—Figure 1 is a longitudinal section through a portion of a belt to which the fastener is applied; Fig. 2 is a sectional plan view thereof; Figs. 3, 4 and 5 are views similar to Fig. 1 illustrating slightly modified constructions.

A is a metallic belt of any suitable construction, B and B' are cylindrical members extending transversely of the belt to which the opposite ends thereof are secured. These members are preferably tubular and at one end the belt is preferably attached to the member B by wrapping it about the same as at C and riveting the return bent portion D to the adjacent portion of the belt. This would form a strong connection between the belt and the member B without producing any localized stresses. The opposite end of the belt may be secured in a similar manner to the corresponding member but I preferably extend this end to underlap the other end portion of the belt and secure the member B' by a separate metallic strap C' which is riveted at D' to the belt. The members B and B' are connected to each other by a bolt E which passes through central slots F therein.

G are segmental bearings engaging the members B and B' and secured to the bolt E. These members are preferably sleeved on the bolt and bear regularly against resilient members H preferably formed of rubber and which in turn bear against metallic washers I which are engaged by the head and clamping nut of the bolt. Thus by screwing up the nut the bearings G will be drawn toward each other and will correspondingly adjust the members B and B'. To reduce friction between the segmental members G and the cylindrical members B and B', the former are preferably recessed to receive a series of rollers or balls J. These are provided with sufficient clearance space to permit travel corresponding to the angular movement of the members G in relation to the members B.

In operation whenever the belt passes about the pulley and is bent into conformity thereto, the members B and B' will be angularly moved in relation to each other. This will cause the bearings G to travel over the surface of the cylinders which is accomplished with slight friction due to the roller bearings. The movement is permitted without binding upon the bolt E by reason of the slots F which are sufficiently elongated to provide for the greatest angular movement. Thus, the belt as it is alternately curved and turned will cause the movement of the parts just described without any stress at the point of connection which would be detrimental. Whenever it is necessary to tighten the belt, this may be done by screwing up the nut as has been already described and undue tension on the belt caused by some obstacle between the same and the pulley will cause the resilent washers H to yield and thereby avoid breakage.

In Fig. 3 a modified construction is shown in which an eye-bolt M is pivotally secured to one of the members B while the construction for the other member is similar to that shown in Fig. 1. In Fig. 4 in place of the bolt passing through the members B and B' a member N is provided which at one end has a segmental bearing corresponding to one of the members G and at its opposite end is provided with an adjustable stud or bolt O which engages members G and H, the bolt O and the stud in the opposite bearing portion of the member N also extending into slots in the cylindrical members. In Fig. 5 in place of the tubular members B, solid cylinders B³ which are merely slotted for the bolt, are substituted, these being riveted or otherwise secured to the ends of the belt. In all of these modifications the same flexing of the belt without the localized stress is permitted and also the adjustment in tension to be yieldable under abnormal stress.

What I claim as my invention is:

1. A belt fastener comprising a pair of transversely extending apertured cylindrical members secured respectively to the opposite ends of the belt, a shank extending through and of lesser cross section than the width of the apertures in said members and having shoulders at its ends, segmental bearings upon opposite sides of said members slidably engaging said shank, and yieldable resilient members between said segmental members and shoulders upon said shank.

2. The combination with a belt, of a fastener therefor comprising a member secured to one end of the belt, and means secured to the other belt end having an adjustable engagement with said member, said last mentioned end being extended beyond the point of connection of said means with the belt and underlapping the other belt end.

3. The combination with a belt, of bearings upon the opposite ends of said belt, and a fastener for the belt ends comprising a shank, complementary bearings on said shank engaging the bearings upon the belt ends and having a limited free relative movement in relation thereto, and a yieldable abutment on said shank adjacent to one of the bearing portions of the shank.

4. The combination with a belt, of cylindrical members extending laterally of and secured to the belt ends, said cylindrical members being apertured transversely of their length, and a fastener for the belt comprising an adjustable shank of lesser cross section than the width of said recess and extending therethrough, segmental bearings on the shank having a sliding engagement with the cylindrical members, and yielding abutments on said shank for said segmental bearings.

5. The combination with a belt, of a cylindrical member extending laterally of one end of the belt and provided with an aperture transversely of its length, a shank secured to the other end of the belt having a limited relative movement, said shank being of lesser cross section than the width of said aperture and extending therethrough, a resilient compressible washer upon said shank, a segmental bearing slidable upon said shank, having a sliding engagement with the cylindrical member and bearing against said washer.

6. The combination with a belt, of a cylindrical member extending laterally of one end of the belt, a metallic strap embracing said member and secured to the belt, said strap and cylindrical member being provided with transverse alining apertures, a segmental bearing for engaging said cylindrical member, a shank passing through said segmental bearing and said alining apertures, and adjustable means for attaching said shank to the opposite ends of the belt.

In testimony whereof I affix my signature in presence of two witnesses.

ROY K. CRONKHITE.

Witnesses:
JAMES P. BARRY,
AUBREY PULLEYBLANK.

Copies of this patent may be obtained for five cents each, by addressing the "Commissioner of Patents, Washington, D. C."